US008272604B2

(12) United States Patent
Foster

(10) Patent No.: US 8,272,604 B2
(45) Date of Patent: Sep. 25, 2012

(54) LOCKING ARM PEDESTAL SYSTEM

(76) Inventor: Gary D. Foster, Batavia, OH (US)

( * ) Notice: Subject to any disclaimer, the term of this patent is extended or adjusted under 35 U.S.C. 154(b) by 184 days.

(21) Appl. No.: 12/659,898

(22) Filed: Mar. 24, 2010

(65) Prior Publication Data
US 2011/0233351 A1  Sep. 29, 2011

(51) Int. Cl.
*A47F 5/00* (2006.01)
(52) U.S. Cl. .................. 248/124.1; 248/125.9; 248/371
(58) Field of Classification Search .................. 248/407, 248/122.1, 124.1, 125.8, 125.9, 121, 125.7, 248/371, 419
See application file for complete search history.

(56) References Cited

U.S. PATENT DOCUMENTS

| | | | | |
|---|---|---|---|---|
| 4,671,478 A | * | 6/1987 | Schoenig et al. | 248/124.1 |
| 4,687,167 A | * | 8/1987 | Skalka et al. | 248/126 |
| 4,706,916 A | * | 11/1987 | Cullmann et al. | 248/168 |
| 5,485,793 A | * | 1/1996 | Crowell | 108/44 |
| 5,751,548 A | * | 5/1998 | Hall et al. | 361/679.41 |
| 5,769,369 A | | 6/1998 | Meinel | |
| 6,093,878 A | * | 7/2000 | Hoshino | 84/421 |
| 6,164,611 A | | 12/2000 | Kuhnke | |
| 6,213,438 B1 | * | 4/2001 | Ostby et al. | 248/276.1 |
| 6,412,426 B1 | | 7/2002 | Holloway, Jr. | |
| 6,796,536 B1 | * | 9/2004 | Sevier, IV | 248/121 |
| 7,121,514 B2 | | 10/2006 | Twyford | |
| 7,384,087 B2 | | 6/2008 | Littlejohn | |
| 7,802,768 B2 | * | 9/2010 | Carnevali | 248/412 |
| 7,845,602 B1 | * | 12/2010 | Young et al. | 248/125.8 |
| 2007/0221794 A1 | * | 9/2007 | Li | 248/124.1 |
| 2008/0164729 A1 | | 7/2008 | Cavanaugh | |
| 2011/0174937 A1 | * | 7/2011 | Sullivan | 248/122.1 |

* cited by examiner

*Primary Examiner* — Bradley Duckworth
(74) *Attorney, Agent, or Firm* — Richard C. Litman

(57) ABSTRACT

The locking arm pedestal system includes a clevis assembly pivotally attached to a plurality of pivotal arms. One of the arms is pivotally attached to a telescoping arm housed in a base, the telescoping arm setting the desired height of the clevis assembly. The base is adapted to be mounted to a vehicle console and floor. The clevis assembly includes a pivotal mounting bracket where an item can be mounted thereon at a desired angle. A pivot locking joint prevents the mounting bracket from pivoting from the desired angle. Each of the pivotal arms also includes similarly configured pivot locking joints to set the desired position of the clevis assembly with respect to the user. Fasteners clamp the locking pivot joints in place.

10 Claims, 4 Drawing Sheets

LOCKING ARM PEDESTAL SYSTEM

BACKGROUND OF THE INVENTION

1. Field of the Invention

The present invention relates to mounting systems, more specifically, to a locking arm pedestal system for supporting items thereon in a stable and safe manner.

2. Description of the Related Art

Many commercial and government vehicles, as well as some private ones, employ some sort of mounting system to support various items such as laptops. The mounting system allows for ergonomic, ready access to the item without having to juggle the same on the user's lap or to search through bags or storage in other parts of the vehicle. While convenient, these mounting systems can be a safety concern.

For example, during everyday use of a vehicle with the typical mounting system installed, the user may experience occasional traffic related incidences such as sudden deceleration, abrupt bumps or accidents. When that occurs, extreme forces are acting upon the item mounted on the mounting system due to the momentum of the vehicle. A typical mounting system includes at least one articulating arm and mounting bracket that can be adjustably positioned by the user where the user can have easy access to the item or laptop mounted at one end of the arm. The other end is pivotally attached to a base. The adjusted positions of the mounting bracket and arm are usually set by simple screw clamps at the pivot joints. As a result, any changes in momentum of the vehicle transfers those forces to the pivot joints where, over time, the clamped engagement can potentially loosen. If the user inadvertently fails to address this potential hazard, the next incidence of momentum change may cause the item to swing about and hit the driver or the interior of the vehicle resulting in an accident. In light of the above, it would be a benefit in the art of mounting systems to provide a safer configuration that substantially reduces the chances of loosened pivots.

Thus, a locking arm pedestal system solving the aforementioned problems is desired.

SUMMARY OF THE INVENTION

The locking arm pedestal system includes a clevis assembly pivotally attached to a plurality of pivotal arms. One of the arms is pivotally attached to a telescoping arm housed in a base, the telescoping arm setting the desired height of the clevis assembly. The base is adapted to be mounted to a vehicle console and floor. The clevis assembly includes a pivotable mounting bracket where an item can be mounted thereon at a desired angle. A pivot locking joint prevents the mounting bracket from pivoting from the desired angle. Each of the pivotal arms also includes similarly configured pivot locking joints to set the desired position of the clevis assembly with respect to the user. Fasteners clamp the pivot locking joints in place.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
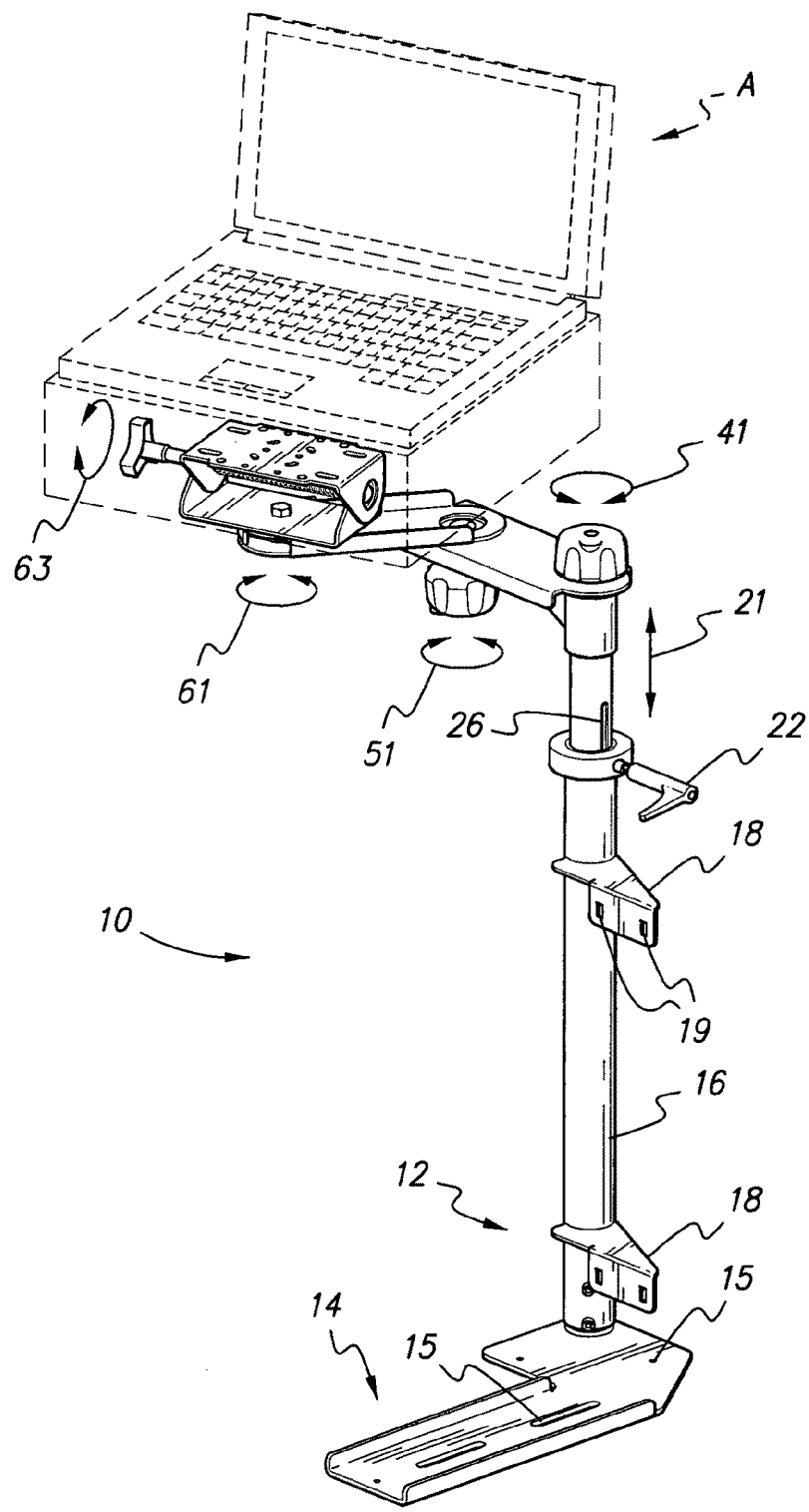
FIG. 1 is an environmental, perspective view of a locking arm pedestal system according to the present invention.
Figure 2:
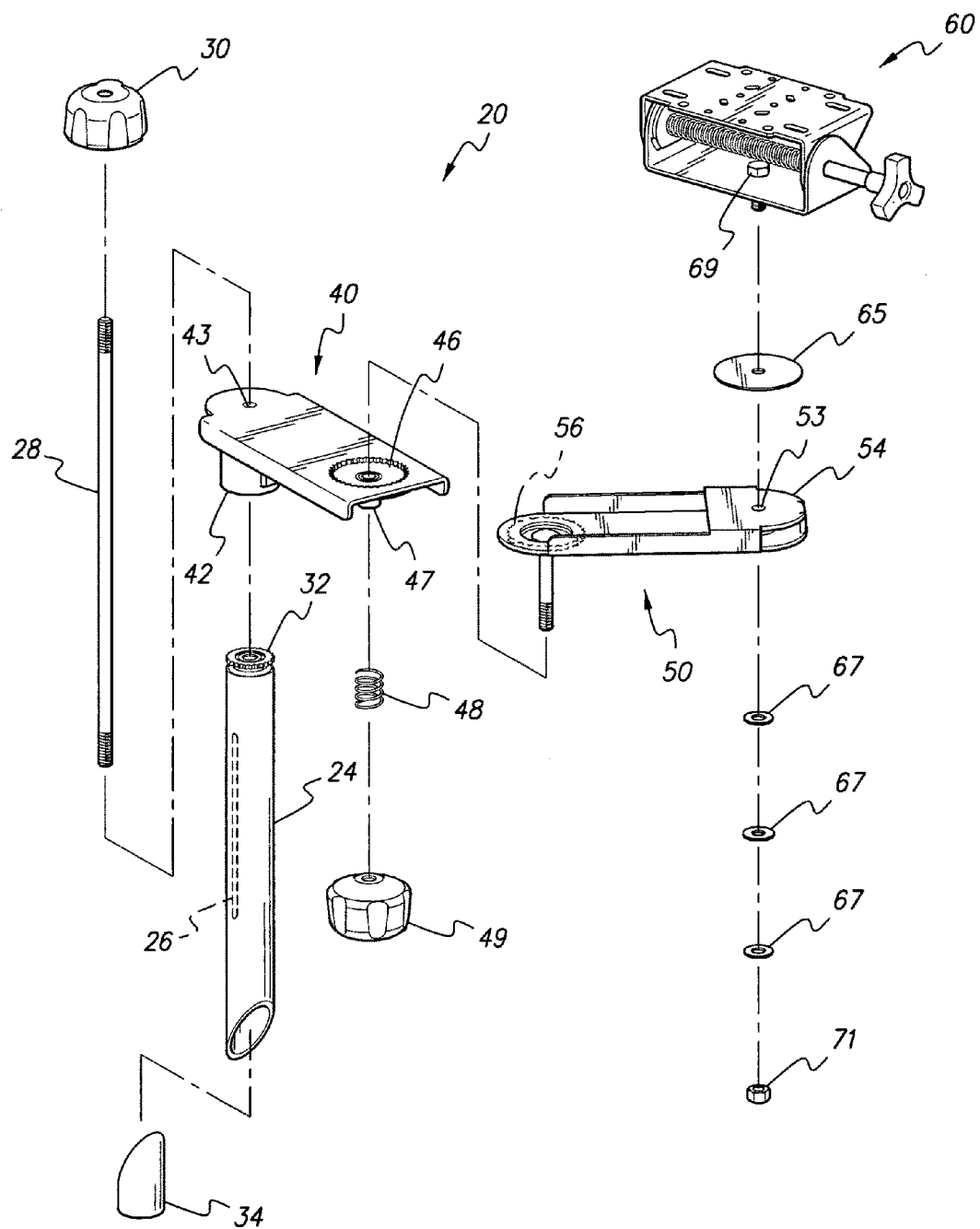
FIG. 2 is an exploded view of the position setting assembly in the locking arm pedestal system according to the present invention.

The present invention relates to a locking arm pedestal system, generally referred to by reference number 10 in the drawings, that locks pivot connections to prevent hazardous undesirable movement of parts. As shown in FIGS. 1 and 2, the locking arm pedestal system 10 includes a positioning assembly 20 mounted to a base 12. The base 12 includes a base mounting bracket 14 from which a support pole, bar or arm 16 extends. The base mounting bracket 14 may be a substantially flat plate with a plurality of mounting holes and slots 15 disposed thereon to facilitate mounting the locking arm pedestal system 10 onto the floorboard of a vehicle or other foundation. The support pole 16 may be a hollow, tubular member that slidably supports the extendable pole, bar or arm 24 housed therein. A plurality of lateral mount brackets 18 with corresponding mounting holes 19 may be disposed at intervals along the length of the support pole 16 so as to provide lateral support for the locking arm pedestal system 10 when installed, e.g., onto a side of a central console in a vehicle.

The positioning assembly 20 includes an extendable or telescoping pole 24, first positioning arm 40, second positioning arm 50 and a clevis assembly 60 adjustably mounted to one end of the second positioning arm 50. The extendable pole 24 sets the desired elevation or height while the first and second arms 40, 50 can be pivoted to set the desired accessible position of the item A mounted to the clevis assembly 60.

To set the height of the positioning assembly 20, as shown by arrow 21, the extendable pole 24 may be a cylindrical tube having a locking rod 28 slidably disposed within the hollow interior with a locking slot 26 formed on a side of the extendable pole 24. The locking slot 26 exposes or allows access to the locking rod 28. When the desired elevation has been reached, the user tightens the handle 22 whereupon a corresponding end of the handle 22 clamps the locking rod 28 and thereby the extendable pole 24 into place. Other clamping assemblies may be employed in place of the handle 22 such as a cam lock.

As shown in FIG. 2, the locking rod 28 may be an elongate, round bar having threaded ends. One of the threaded ends is attached to a bar wedge 34 while the other end is attached to a clamping knob 30 clamping the first positioning arm 40 therebetween. With this configuration, the locking rod 28 serves two purposes. Besides helping to set the height of the positioning assembly 20, the locking rod 28 also permits adjustable repositioning of the first positioning arm 40. The lower end of the extendable pole 24 includes a beveled edge. Accordingly, the bar wedge 34 includes a mating beveled edge. When assembled with the first positioning arm 40, the bar wedge 34 allows reciprocating movement of the locking rod 28 whenever the clamping knob 30 is loosened but prevents the locking rod 28 from rotating because of the interfering beveled edges between the bar wedge 34 and the extendable pole 24, i.e., the bar wedge 34 forms a base that maintains the locking rod 28 in a stationary position with respect to the support pole 16 such that repositioning of the first locking arm 40 may be facilitated.

Once the height has been set, the first and second positioning arms 40, 50 can be manipulated to set the desired position toward or away from the user as desired. As shown in FIG. 2, the first positioning arm 40 may be an elongate, channeled plate 44 having bores at opposite ends. The bore 43 extends through a bushing 42 extending downwardly or depending from the bottom of the plate 44. The bushing 42 is adjustably mounted over the upper end of the extendable pole 24 in the adjustable directions indicated by arrow 41 by loosening the knob 30 to allow rotated repositioning of the first arm 40. One of the threaded ends of the locking rod 28 extends through the bore 43, and the clamping knob 30 firmly fixes the rotated or pivoted position of the first positioning arm 40.

The clamping engagement via the knob 30 is not enough to minimize unwanted and potentially dangerous movement of the first positioning arm 40 whenever abrupt forces are acting thereon. To minimize this possibility, the locking arm pedestal system 10 includes pivot locking connections or joints. The pivot locking connection between the first positioning arm 40 and the extendable bar 24 includes a toothed male locking member or spline 32 and a corresponding female locking member or spline within the bushing 42 (not shown but similar to the female spline 46), the female locking member having a corresponding recess with a tooth configuration matching that of the male spline 32. The mating tooth configuration between the male spline 32 and the female spline within the bushing 42 prevents any rotation of the first positioning arm 40 with respect to the extendable arm 24 once assembled and clamped. Thus, the adjusted rotated position of the first positioning arm 40 is locked.

The second positioning arm 50 is rotatably or pivotally mounted to the first positioning arm 40 at the opposite end of the first arm 40 from the bore 43. The second positioning arm 50 is similar to the first positioning arm 40 in that the second arm 50 may also be an elongate, channeled plate 54 having bores at opposite ends. The second positioning arm 50 also includes a pivot locking connection between the first positioning arm 40 and the second positioning arm 50 via the recessed toothed female locking member or spline 46 and a corresponding toothed male locking member or spline 56 at the bottom of the channeled plate 54. A threaded fastener 52 extends through the bore in the male and female splines 46, 56 and the bushing 47 where another clamping knob 49 connects to the fastener 52 to set the rotated position between the arms 40, 50, the adjustable positioning shown by arrow 51. The clamping knob 49 may be biased by a spring 48 to help prevent separation between the arms 40, 50 whenever the knob 49 is loosened.

Figure 3:
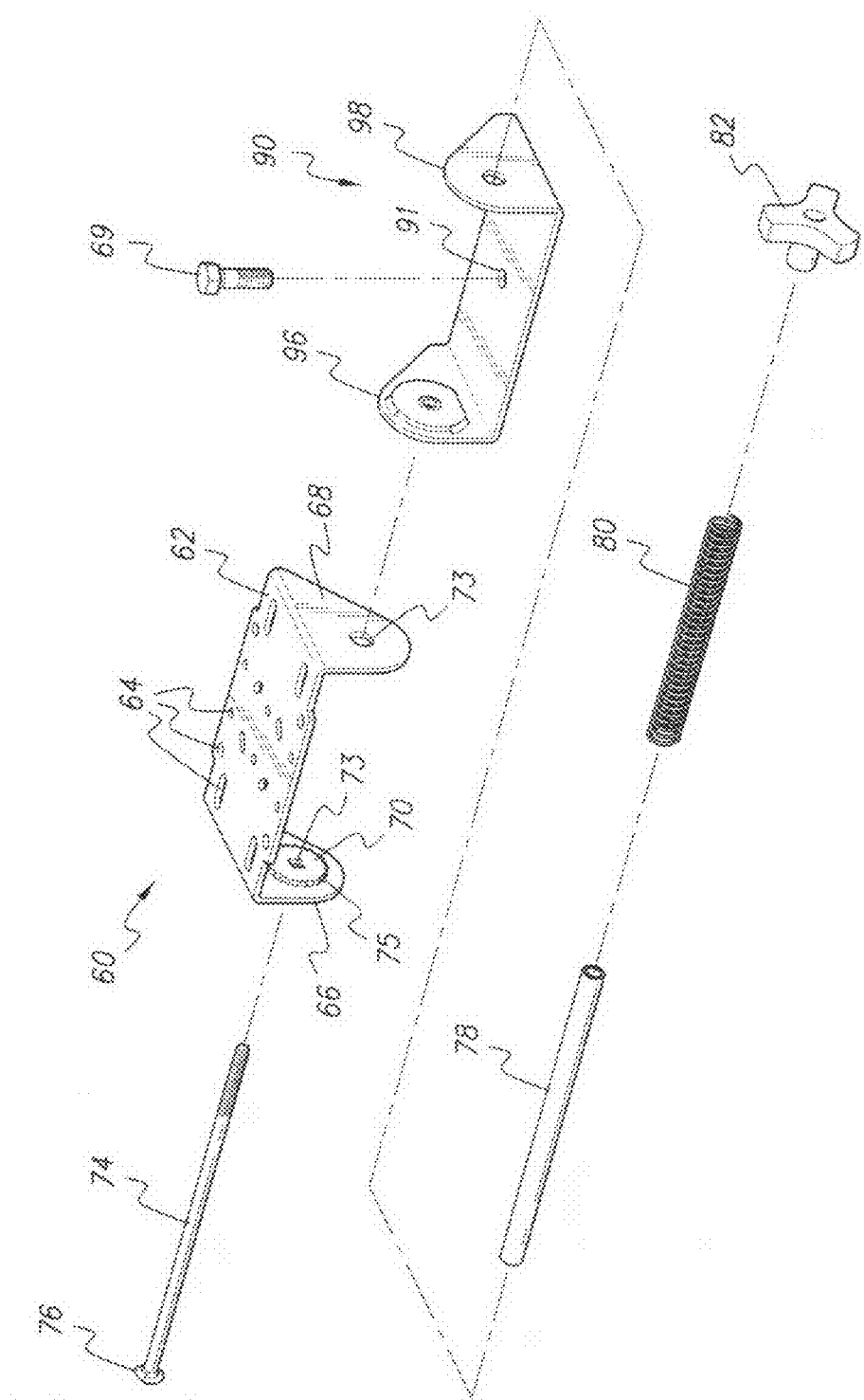
FIG. 3 is an exploded view of the clevis assembly in the locking arm pedestal system according to the present invention.
Figure 4:
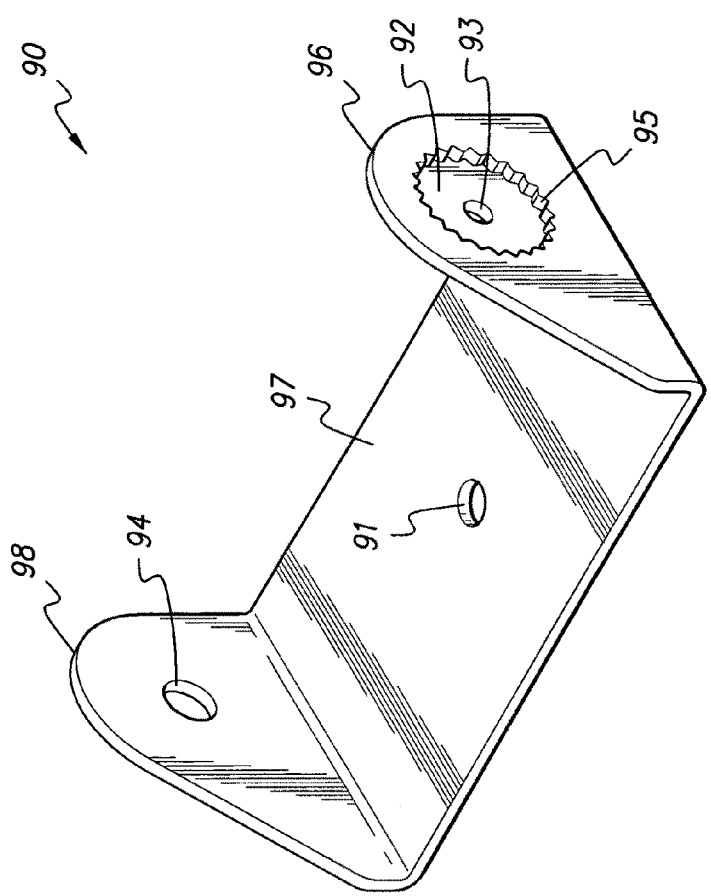
FIG. 4 is a perspective view of the lower bracket in the clevis assembly for the locking arm pedestal system according to the present invention.

The clevis assembly 60 is rotatably attached to the other end of the second positioning arm 50 by fasteners such as a bolt 69, nut 71 and washers 65, 67, the rotatable positioning indicated by arrow 51. As shown in FIGS. 3 and 4, the clevis assembly 60 includes an upper mounting bracket 62 pivotally attached to a lower mounting bracket 90. The pivotable upper mounting bracket 62 permits the user to set the angular disposition of the item A with respect to the user as indicated by arrow 63. The upper mounting bracket 62 may be substantially U-shaped with extensions or legs 66, 68. The top portion of the upper mounting bracket 62 includes various mounting slots 64 to mount an item A thereon, such as a laptop. The item A would typically be attached to the upper mounting bracket 62 via a separate bracket, and the various slots 64 accommodates mounting of a wide range of brackets. The lower mounting bracket 90 is similarly configured as a U-shaped plate 97 having extensions or legs 96, 98. A central bore 91 on the plate 97 facilitates mounting of the lower bracket 90 to the end of the second positioning arm 50. It is noted that a locking pivot connection is not included between the lower bracket 90 and the second positioning arm 50 because disturbances would not cause the item A to swing. At most if the connection is loose, the item A would rotate about the fastener 69. However, this pivot connection may also include a locking pivot similar to the ones between the first and second arms 40, 50.

As with the first and second positioning arms 40, 50, the clevis assembly 60 also includes a pivot locking connection. In that regard, the locking pivot connection of the clevis assembly 60 includes a toothed male locking member or spline 70 on the interior of the leg 66 that seats within the toothed female locking member or spline 92 on the exterior of the leg 96. The mating male teeth 75 and the female teeth 95 prevents pivoting or rotation of the upper mounting bracket 62 once the angular position has been set.

The upper and lower brackets 62, 90 are rotatable about a pivot pin 74 extending through the bores 73 in the upper bracket 62, an intermediate sleeve 78, and the bores 93, 94 in the lower bracket. The pivot pin 74 may be threaded at one end while the other end includes a square shaped head 76. The head 76 engages a correspondingly shaped bore 73 to keep the pin 74 stationary and prevent relative rotation thereof. The threaded end connects to a clamping knob 82 to set the pivoted position of the upper bracket 62. Since wear and tear as well as the weight of the object or item A creates stresses at the pivot, the clevis assembly 60 also includes a tension spring 80 surrounding the sleeve 78 to ensure a tight clamping engagement between the extensions in the respective legs of the upper and lower brackets 62, 90.

Thus, it can be seen that the locking arm pedestal system 10 includes enhanced safety features. The locking pivot connections ensure that the articulated elements stay in the adjusted position, especially in situations where abrupt forces are acting thereon. Moreover, the arms 40, 50 and the clevis assembly 60 are easily adjusted by loosening the corresponding clamping knobs 30, 49, 82 to allow the toothed connection to be disengaged.

It is to be understood that the locking arm pedestal assembly encompasses a variety of alternatives. For example, the pivot locking connections can include radiating teeth instead of the teeth at the edges. Various shapes and numbers of teeth may be used depending on the degree and ease of adjustments desired. Moreover, selectively engageable detents may also be viable alternatives.

It is to be understood that the present invention is not limited to the embodiments described above, but encompasses any and all embodiments within the scope of the following claims.

I claim:

1. A locking arm pedestal system, comprising:
   a base having a mounting bracket and an upwardly extending support pole, the mounting bracket being adapted for attaching the base to a foundation;
   a positioning assembly for positioning and supporting an object at a desired position, the positioning assembly being attached to the base, the positioning assembly having;
      an extendable arm slidably disposed in the support pole and having a splined end extending from the support pole, a locking handle selectively locking the extendable arm thereby setting the height of the positioning assembly;

a first positioning arm pivotally mounted at one end thereof to the extendable arm and having a splined pivot locking joint corresponding to the splined end of the extendable arm;

a second positioning arm pivotally attached to the first positioning arm at an end opposite from the one end for horizontal rotation and having a splined pivot locking joint thereat, wherein the pivotal movement is the sole movement between the first and second positioning arms;

a clevis assembly pivotally mounted to the second positioning arm for horizontal rotation, the clevis assembly supporting the object at a desired angle, the angle being locked at a pivot locking joint;

clamp assemblies for setting positions of the extendable arm, first and second positioning anus and the clevis assembly; and at least one lateral mount bracket disposed directly on the support pole to laterally support the base on the foundation;

wherein the pivot locking joints prevent hazardous movement of the positioning assembly when abrupt forces act thereon.

2. The locking arm pedestal system according to claim 1, wherein said extendable arm comprises an elongate, hollow tube having an open, beveled end and an opposite end, and an elongate slot disposed on a side of said tube.

3. The locking arm pedestal system according to claim 2, wherein said clamp assembly for said extendable arm comprises:

an elongate locking rod slidably disposed within said tube, said locking rod being accessible through said elongate slot on said hollow tube, said locking rod having threaded ends, one of said ends being connected to one of said clamping assemblies on said at least one arm;

a bar wedge attached to the other of said threaded ends, said bar wedge having a beveled edge; and a clamping handle disposed on said support pole, said clamping handle having a portion engaging said locking rod through said elongate slot to clamp said extendable arm at the desired height.

4. The locking arm pedestal system according to claim 1, wherein said first positioning arm includes a first pivot locking joint at one end and a second pivot locking joint at the other end, said first pivot locking joint comprising a toothed male spline disposed on one end of said extendable arm and a recessed toothed female spline disposed on one side of said first positioning arm.

5. The locking arm pedestal system according to claim 4, wherein said second pivot locking joint comprises a recessed toothed female spline disposed on the opposite side of said first positioning arm and a toothed male spline disposed on one side of said second positioning arm.

6. The locking arm pedestal system according to claim 1, wherein said clevis assembly comprises:

a lower mounting bracket;

an upper mounting bracket pivotally connected to said lower mounting bracket; and a biased pivot pin connecting said upper and lower mounting brackets, the pivot locking joint being disposed between the upper and lower mounting brackets.

7. The locking arm pedestal system according to claim 6, wherein said upper mounting bracket comprises a substantially U-shaped plate having a central portion and legs extending from said central portion, the central portion having a plurality of slots for attaching a mounting bracket for said object.

8. The locking arm pedestal system according to claim 7, wherein said lower mounting bracket includes a substantially U-shaped plate having a central portion and legs extending from said central portion, said pivot locking connection comprising a toothed male spline disposed on one of said legs of said upper mounting bracket and a recessed toothed female spline disposed on one of said legs of said lower mounting bracket.

9. The locking arm pedestal system according to claim 1, wherein said clamping assembly for said at least one arm comprises clamping knobs.

10. A locking arm pedestal system, comprising:

a base having a mounting bracket and an upwardly extending support pole, the mounting bracket being adapted for attaching the base to a foundation;

a positioning assembly for positioning and supporting an object at a desired position, the positioning assembly being attached to the base, the positioning assembly having;

an extendable arm slidably disposed in the support pole, the extendable arm setting relative height of the positioning assembly;

at least one arm pivotally mounted to the extendable arm, the at least one arm having at least one pivot locking joint;

a clevis assembly pivotally mounted to the at least one arm, the clevis assembly supporting the object at a desired angle, the angle being locked at a pivot locking joint;

clamp assemblies for setting positions of the extendable arm, the at least one arm and the clevis assembly; and at least one lateral mount bracket disposed directly on the support pole to laterally support the base on the foundation, wherein the pivot locking joints prevent hazardous movement of the positioning assembly when abrupt forces act thereon.

\* \* \* \* \*